Nov. 10, 1970    J. J. SMITH    3,538,545
PLASTIC MESH EXTRUSION DIES

Filed Nov. 25, 1968    3 Sheets-Sheet 1

INVENTOR.
JESSE J. SMITH
BY
Wm. H. Dean

Nov. 10, 1970 — J. J. SMITH — 3,538,545
PLASTIC MESH EXTRUSION DIES
Filed Nov. 25, 1968 — 3 Sheets-Sheet 2

INVENTOR.
JESSE J. SMITH
BY
*Wm. H. Dean*

United States Patent Office 3,538,545
Patented Nov. 10, 1970

3,538,545
PLASTIC MESH EXTRUSION DIES
Jesse J. Smith, P.O. Box 162, Garden City, Kans. 67846
Filed Nov. 25, 1968, Ser. No. 778,380
Int. Cl. B29f *3/00;* B29d *23/12*
U.S. Cl. 18—12              6 Claims

ABSTRACT OF THE DISCLOSURE

A plurality of concentric relatively rotatable die members having a common rotary axis; said die members having concentric annular rows of plastic extruding passages; said passages all having longitudinal axes directed substantially parallel to each other and parallel to said rotary axis; and wall means projecting beyond terminal open ends of said passages whereby filaments extruded from said terminal open ends may expansively react laterally from said wall means and force some of said filaments into welding contact with other of said filaments.

BACKGROUND OF THE INVENTION

Various plastic mesh extrusion dies have been operable to produce plastic mesh and have employed various orifice arrangements for extruding filaments and welding them internally of the dies and externally of the dies. Examples of the prior art include Patents 3,067,084 and 3,308,220. The former patent discloses a mandril for expanding a tubular mesh structure to cause welding of the filaments together as they are extruded from the dies and the latter patent discloses orifices disposed at axial angles to each other ranging between 90 and 180 degrees to cause forceful impingement of the filaments as they emerge from the dies whereby the filaments are welded together in free space without the use of a mandril.

SUMMARY OF THE INVENTION

The present invention employs a normal extrusion die arrangement which includes wall means extending beyond the terminal open ends of a plurality of annular rows of orifices which extend axially parallel to the rotary axis of the dies; the wall means being disposed adacent the extrusion orifices and providing means from which the extruded filaments may react expansively in a lateral direction to bulge the extruded filaments into contact with adjacent extruded filaments so as to cause welding thereof as they are extruded in an axially parallel relation to each other. Inasmuch as all of the filaments are thus extruded axially parallel to the rotary axis of the dies, rapid linear extrusion rates may be accomplished and the wall means projecting beyond the terminal open ends of the extrusion orifices provides for a reactive surface for lateral or expansive reaction of some of the filaments laterally into contact with other filaments being extruded by adjacent die members; the die members being separated by thin partition means which also separate respective annular rows of orifices in respective adjacent die members, the partition means being thin so as to permit complete welding contact of adjacent rows of filaments being extruded when such filaments react expansively and laterally from said wall means as the filaments emerge from the terminal open ends of the orifices during extrusion thereof from the dies of the invention. The present invention therefore requires no expanding mandrel to cause welding and provides for axially parallel extrusion of all of the filaments in order to obtain high linear extrusion rates and to extrude all of the filaments at substantially the same axial rate.

Accordingly, it is an object of the present invention to provide plastic mesh extrusion dies wherein a plurality of concentric relatively rotatable die members are rotatable on a common rotary axis, the die members having concentric annular rows of plastic extruding passages separated by a thin annular partition means, the passages all having longitudinal axes directed substantially parallel to each other and parallel to the rotary axis of the dies, and wall means projecting beyond the terminal open ends of the passages to provide a surface from which the plastic filaments being extruded may expansively react laterally into contact with the filaments being extruded from adjacent dies to thereby provide welding of the adjacent filaments together as they are extruded from the dies in free space while the dies rotate relative to each other and cause helically angular disposition of filaments extruded from one die relative to filaments extruded from another die.

Another object of the invention is to provide a novel plastic mesh extrusion die means from which filaments are extruded from a plurality of annular rows of extrusion orifices disposed substantially parallel to the rotary axis of the dies, whereby all of the extrusion orifices of all of the dies are substantially parallel and may extrude plastic filament at substantially the same linear rate.

Another object of the invention is to provide a novel plastic mesh extrusion die means which is very simple to produce, easy to maintain and which is very reliable in operation.

Another object of the invention is to provide a plastic mesh extrusion die means which is capable of producing a great variety of plastic mesh from various filaments and which is capable of providing efficient welding of the filaments together in free space as the filaments emerge from the die members.

Further objects and advantages of the invention may be apparent from the following specification, appended claims, and accompanying drawings.

DESCRIPTION OF THE PREFERRED EMBODIMENTS

The plastic mesh extrusion dies, as disclosed herein, may be operated in connection with extruders as shown in the Smith patent 3,308,220 issued Mar. 7, 1967.

Further, the means for rotatably supporting the dies of the present invention may be similar to that shown in said patent.

Figure 1:
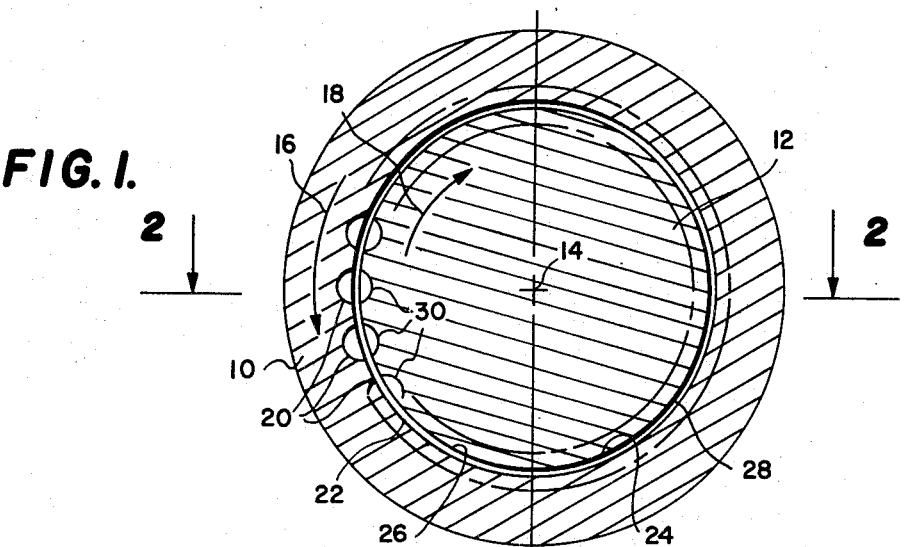
FIG. 1 is an axial end view of a plurality of relatively rotatable die members showing open terminal ends of plastic mesh extrusion orifices of the die members.
Figure 2:
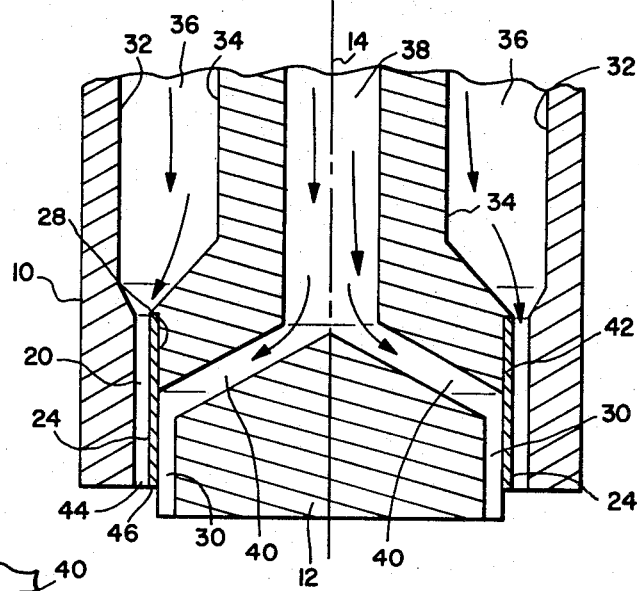
FIG. 2 is a fragmentary axial sectional view taken from the line 2—2 of FIG. 1 showing details of the die members of the invention.
Figure 3:
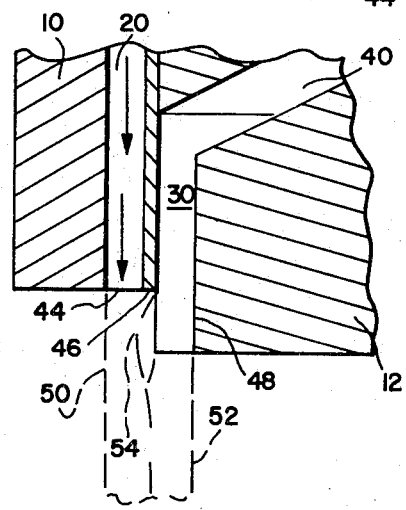
FIG. 3 is a fragmentary sectional view taken on the same plane as that shown in FIG. 2, but showing the structure on enlarged scale and showing the broken lines plastic mesh filaments being extruded from the dies and expansively reacting and bulging laterally into welding contact with each other beyond the open terminal ends of the orifices of one of the die members.

As shown in FIGS. 1, 2 and 3 of the present application, a pair of die members 10 and 12 are concentric and rotatable about a common axis 14. These dies are adapted to counter rotate as indicated by arrows 16 and 18 so as to provide for the extrusion of plastic mesh in a tubular form with the strands from the orifices of each respective die member to be helically disposed to and welded in connection with the filaments extruded from the adjacent die member.

The die member 10 is provided with an annular row of filament extruding passages 20; these passages 20 having longitudinal axes substantially parallel with each other and substantially parallel with the die rotary axis 14.

The orifices 20 are recessed radially outward from a bore portion 22 of the die member 10 and a partition member 24 in the form of a thin annular sleeve is closely fitted to the bore 22 and secured to the die member 10 by any suitable means, such as brazing, welding, or otherwise. The passages 20 have a cross sectional shape which is substantially semi-circular, as shown in FIG. 1, and the partition member 24 in the form of a thin annular sleeve forms one side of the passages 20; this sleeve 24 has a bore portion 26 which is rotatably disposed adjacent an external annular surface 28 of the die member 12, the partition member 24 thus forming a bearing between the die members 10 and 12.

The die member 12 is provided with an annular row of filament extruding passages 30, and these passages 30 are substantially axially parallel to the passages 20 and to the axis 14 of the rotary die members 10 and 12. The passages 30 are semi-circular in cross section and generally opposed to the passages 20 and communicate directly with the hollow tubular sleeve-like partition member 24 so that the only separation between the passages 20 and 30 is the thin partition 24. This thin partition 24 may be only a few thousandths of an inch thick so that the passages 20 and 30 of the respective die members 10 and 12 are very close together and axially parallel.

The die member 10, normally above the passages 20, is provided with an enlarged bore portion 32 which surrounds a reduced diameter portion 34 of the die member 12 providing an annulus 36 which is adapted to communicate with a plastic extruder so that hot plastic may be forced through the annulus 36 and through the passages 20.

The die member 12 is provided with a central passage 38 adapted to receive plastic under pressure from an extruder, and this passage 38 is provided with radial passages 40 which communicate directly with the axially disposed passages 30 hereinbefore described.

It will be seen that the sleeve-shaped partition member 24 is provided with a portion 42 extending axially beyond the juncture between the radially extending passages 40 and the extruding passages 30 so as to provide an annular seal surrounding the periphery of the die member 12 in order to insure the direction of plastic from the annulus 36 into the passages 20.

It will be appreciated by those skilled in the art that the pressure of plastic in the passages 40 is substantially the same as the pressure exerted in the annulus 36, and therefore this substantially prevents cross leakage of plastic from the annulus 36 to the passages 30 or from the passages 30 to the annulus 36.

As shown in FIG. 3 of the drawings, the passages 20 of the die member 10 are provided with open terminal ends 44 and the partition means 24 is provided with an end 46 substantially on the same plane as the terminal open ends 44 of the passages 20. The passages 30 are provided with terminal open ends disposed on the same plane as the terminal open ends of the passages 20.

The die member 12 is provided with a wall portion 48 which is extended beyond said terminal open ends 44 of the passages 20, and this wall portion 48 is generally a continuity of one side of the passages 30 which one side faces the plastic filaments which issue from the passages 20.

As shown in FIG. 3 of the drawings, the passages 20 are adapted to extrude plastic filaments 50 from the annular row of said passages and the passages 30 of the die 12 are adapted to extrude plastic filaments 52 generally parallel to the plastic filaments 50 and in close proximity thereto, separated only by the very thin partition 46 hereinbefore described.

As the filaments 52 are extruded beyond the terminal open ends of the passages 20, the filaments 52 react expansively away from the wall portion 48 and bulge laterally a substantially greater distance than the thickness of the partition 46 so as to interfere and weld with the plastic filaments 50. Since the dies 10 and 12 rotate relative to each other in generally opposite directions, the filaments 50 and 52 are disposed in helical disposition in opposite directions and in crossed relations with each other to form generally diamond-shaped plastic mesh.

It will be appreciated that each wall portion 48 adjacent or forming a continuity of each passage 30 provides some frictional resistance relative to the filament 52 as it emerges beyond the terminal open ends of the orifices 20 and 30, and thus causing the relative compression of the material causing it to bulge laterally, as indicated by a broken line 54 in FIG. 3. This lateral expansive and bulging of the filaments 52 effectively causes the filaments 50 and 52 to intersect or interfere with each other while still very hot, and to thereby become fused together at the mesh intersections of these filaments 50 and 52.

Due to the fact that all of the passages 20 and 30 are substantially parallel to each other and substantially parallel to the rotary axis 14 of both dies 10 and 12, high linear extrusion rates may be accomplished and efficient welding is provided by means of the wall 48 forming a surface against which some of the filaments may frictionally react and expansively react toward filaments extruded by the other of the dies.

Figure 4:
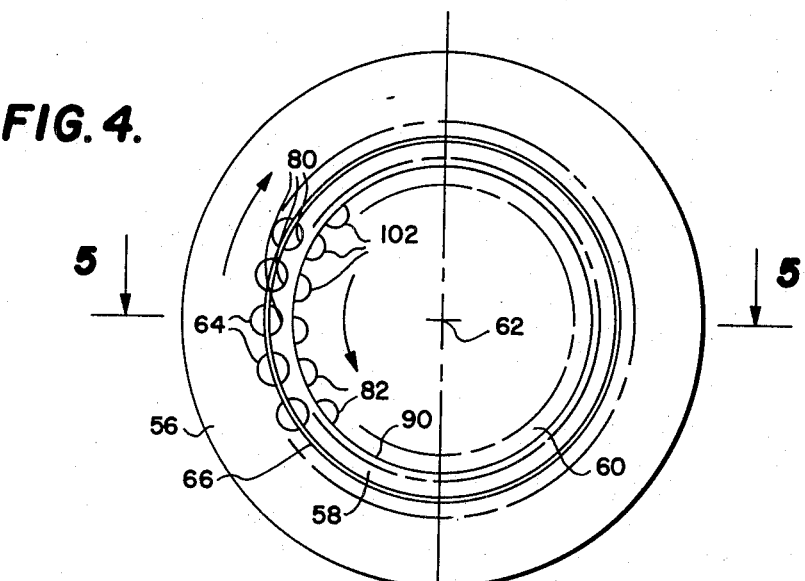
FIG. 4 is a view similar to FIG. 1 and showing a modification of the invention which is adapted to extrude plastic mesh filaments from three concentric annular rows of extruding orifices.

In the modification, as shown in FIG. 4 of the drawings, three separately rotatable dies 56, 58 and 60 are all concentric and rotatable about a common axis 62. The die member 56 is provided with plastic filament extrusion passages 64 which have extrusion axes substantially parallel to the rotary axis 62 of the die members 56, 58 and 60. These passages 64 are arranged in an annular row, as shown in FIG. 4 of the drawings, and an annular partition member 66 in the form of a hollow cylindrical sleeve is fixed to the die member 56 and forms one side of the passages 64; this partition member 66 may be furnace brazed or otherwise secured to the die member 56 so as form inner sides of the passages 64. The partition member 66 is provided with an annular bore 68 which surrounds and closely fits the die member 58 to form a relatively rotatable bearing with relation thereto.

The passages 64 are provided with open terminal end portions 70 from which plastic filaments, as indicated by broken line 72, may be extruded.

The die member 58 is provided with a peripheral portion 74 spaced from a bore portion 76 of the die member 56 to form an annulus 78 through which hot plastic may be delivered under pressure to the passages 64.

The die member 58 is provided with an annular row of passages 80 communicating directly with the bore 68 of the partition member 66; these passages are integral with the die member 58 which is provided with thin partition means 82 adjacent each passage 80, this partition means being an integral part of the die member 58, and this die member 58 may be of two portions fused together at 84 either by way of furnace brazing or otherwise so as to connect the lower passage portion of the die with a normally upper hollow cylindrical body portion 86, the periphery 74 of which forms one side of the annulus 78.

It will be understood that the partition portions 82 adjacent the passages 80 perform similarly with respect to the partition 66 and the partition 24 hereinbefore described in connection with FIGS. 1 to 3 of the drawings.

Figure 5:
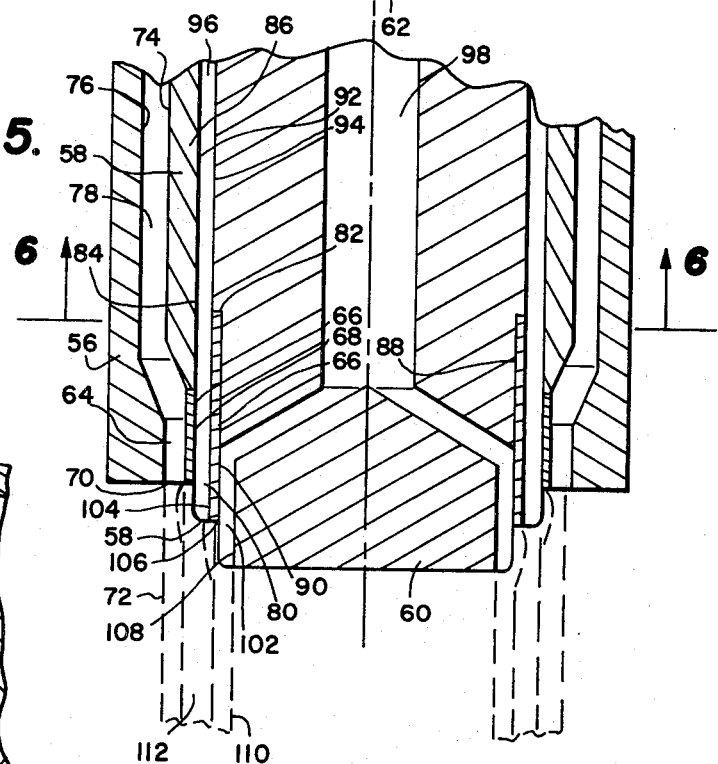
FIG. 5 is a fragmentary sectional view taken from the line 5—5 of FIG. 4.

Disposed radially inward from the partition portions 82 shown in FIG. 5 is the die member 60 having a peripheral portion 88 closely rotatably mounted in a bore portion 90 of the die member 58 inwardly of the partition portions 82 shown best in FIG. 4 of the drawings.

The die member 58 is provided with a bore 92 spaced from the perimeter 94 of the die 60 so as to form an annulus 96 through which hot plastic material may be delivered under pressure by means of an extruder, this being an extruder separate from the one adapted to deliver hot plastic under pressure into the annulus 78.

The die 60 is provided with a hot plastic conduit bore portion 98 adapted to receive hot plastic from still another extruder. Communicating with the bore portion 98 are radial passages 100 which communicate with filament extrusion passages 102. These passages 102 are disposed in an annular row, as shown in FIG. 4 of the drawings, and their outer portions communicate directly with the bore 90 of the die member 58. These passages 102 are axially parallel with the passages 80 and 64, and are generally axially parallel with the rotary axis 62 about which the dies 56, 58 and 60 concentrically rotate relative to each other.

It will be seen that the die member 58 is provided with an outwardly directed wall portion 104 facing plastic filaments 72 which are extruded from the terminal open ends of the passages 64, the wall portions 104 being extended beyond said terminal open end passages 104 and provide for a reaction surface from which filaments may expansively react and bulge outwardly beyond the partition means 66 and into welding contact with the filaments 72.

The passages 102 likewise extrude plastic filaments and extending beyond terminal end portions of the passages 80 and beyond a respective end 106 of the partition 66 are wall portions 108 forming one side of each of the passages 102. Likewise filaments 110, being extruded from the passages 102, react laterally and expansively away from the wall portions 108 and bulge into sufficient bulk to overly or extend radially beyond the partition 66 and interfere or weld with the filaments 112 which are extruded from the passages 80.

Figure 6:
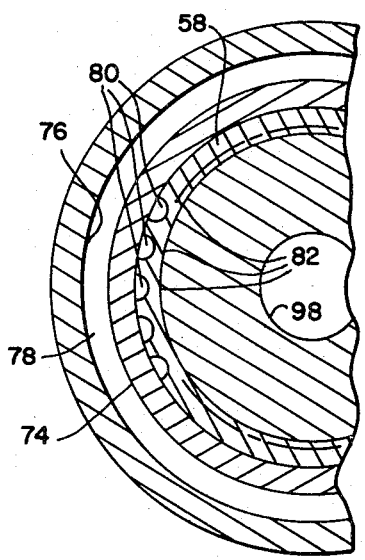
FIG. 6 is a fragmentary sectional view taken from the line 6—6 of FIG. 5.

In connection with the operation of the modified structure of the invention disclosed in FIGS. 4, 5 and 6, three plastic extruders may be operated individually to force hot plastic under pressure through the annulus 78 and respective passages 64, through the annulus 96 and respective passages 80, and through the bore 98 and respective passages 102, such that the filaments 110 and 112 constantly and expansively react and bulge laterally away from the wall portions 104 and 108 to thus provide an efficient bonding relation between all of the filaments 72, 110 and 112.

It will be obvious to those skilled in the art that the dies 56, 58 and 60 may all be relatively rotatable in different directions, or at different speeds. It will be also obvious that the die member 58 may be stationary while the dies 56 and 60 rotate relatively in opposite directions and/or at different speeds.

Figure 7:
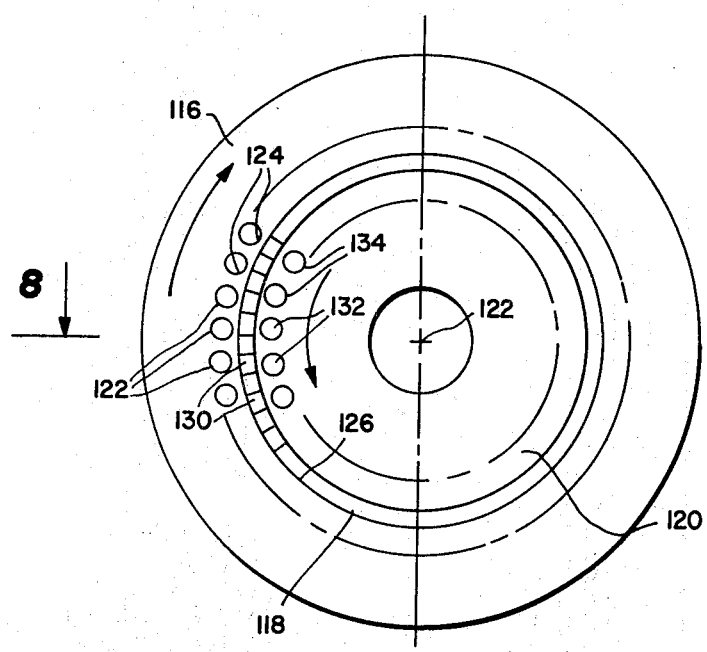
FIG. 7 is a view similar to FIGS. 1 and 4, but showing a further modification of the invention.
Figure 8:
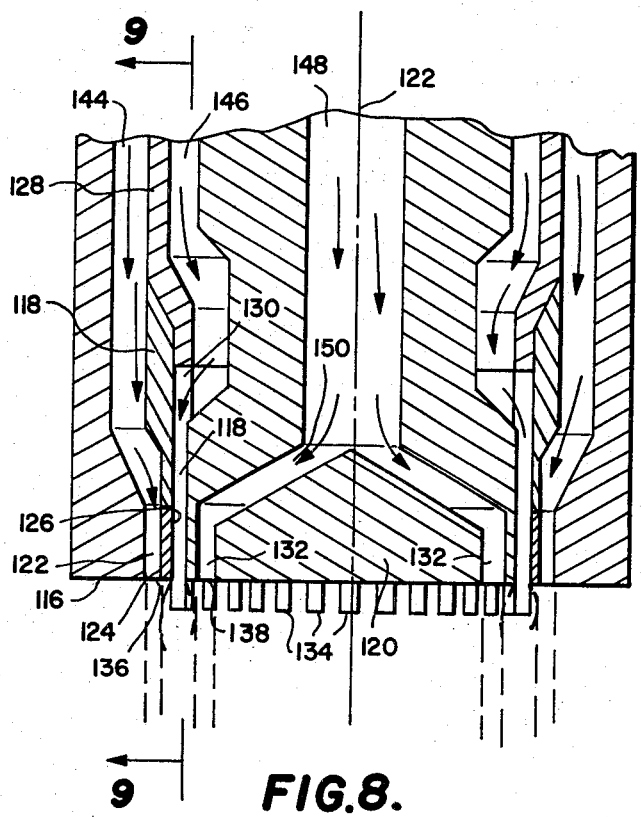
FIG. 8 is a fragmentary axial sectional view taken from the line 8—8 of FIG. 7.
Figure 9:
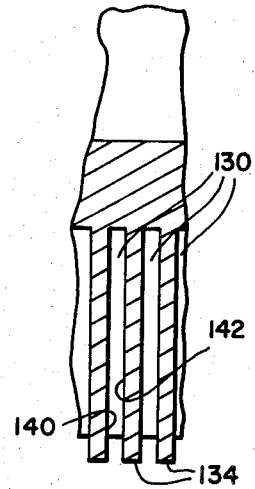
FIG. 9 is a fragmentary sectional view taken from the line 9—9 of FIG. 8.

In the modification of the invention as shown in FIGS. 7, 8 and 9, die members 116, 118 and 120 are all concentrically and relatively rotatable on a common axis 122. The die member 116 is provided with an annular row of filament extrusion passages 122 and adjacent one side of each of these passages is a partition portion 124 which separates the passages 122 from a bore portion 126 of the die member 116.

Concentrically disposed in the bore portion 126 is the die 118. This die 118 is provided with a supporting hollow cylindrical member 128. The die 118 is provided with an annular row of generally rectangular passages 130, these passages being substantially parallel to the passages 122 in the die 116, and all of these passages are also parallel with the rotary axis 122 of the dies 116, 118 and 120.

The passages 130 are separated from the passages 122 by means of the partition portions 124 hereinbefore described. The die member 120 is provided with an annular row of passages 132 having partition portions 134 separating each of the passages 132 from the passages 130 in the die 118.

The partition portions 124 and 134 are preferably integral with the dies 116 and 120 and are thin so as to provide minimum separation between the passages 122 and 130 and the passages 130 and 132.

The passages 130 are separated by fingers 134, and these fingers 134 project beyond the open terminal ends 136 and 138 of the passages 122 and 132, respectively. As shown in FIG. 8, these fingers extend from the die 118 between the partition portions 122 and 132 and project beyond the terminal open ends 136 and 138 of the passages 122 and 132 in order to provide walls between which filaments may expansively and frictionally react to bulge laterally into contact with filaments being extruded from the passages 122 and 132 beyond their terminal open ends 136 and 138.

As shown in FIG. 9 of the drawings, the fingers 134 have adjacent wall portions 140 and 142 extending beyond the ends of the dies 116 and 120, and plastic material being extruded through the passages 130 between the fingers 134 tends to expand due to friction on the walls 140 and 142, the expansion being laterally in a bulging relation toward elements being extruded from the passages 122 and 132 so that molten material of the filaments weld together immediately after the filaments are extruded from the passages 130, 122 and 132 in substantially the same manner as hereinbefore described.

The die mechanism shown in FIGS. 7, 8 and 9 comprises an annulus 144 between the dies 116 and 118 for the feeding of plastic material under pressure to the passages 122, and another annulus 146 is disposed between the dies 118 and 120 for forcing plastic into the passages 130 and the die member 120 is provided with a bore 148 communication with radial passages 150 which conduct hot plastic to the extrusion passages 132.

It will be appreciated that the passages 122, 130 and 132 have extrusion axes which are all substantially parallel with each other and substantially parallel with the rotary axis 122 of the die members 116, 118 and 120.

All of the structures of the invention, in accordance with the foregoing disclosure, employ wall portions extending beyond the terminal open ends of passages of adjacent relatively movable dies, and the wall portions are adjacent to or form a continuation of plastic filament extrusion passages so that the filaments may react frictionally and in a lateral expansive bulging relationship toward filaments being extruded from adjacent orifices and to overly the partition means between the adjacent annular rows of orifices of the dies so that the bulging function causes the molten plastic of the adjacent annular rows of filaments to become welded together outside the dies as the filaments progress axially parallel to each other from the generally axially parallel passages of each of the die members.

These passages are all substantially parallel, and thus extrude at substantially the same linear rates with exception of the fact that some lateral bulging of some of the filaments over the partition areas to accomplish welds with adjacent filaments.

It will be obvious to those skilled in the art that various modifications may be resorted to without departing from the spirit of the present invention.

I claim:

1. In plastic mesh extrusion dies the combination of: a plurality of concentric relatively rotatable die members having a common rotary axis; said die members having concentric annular rows of plastic extruding passages; a thin annular partition means separating said concentric annular rows of passages, said partition means having an annular surface disposed to serve as a rotary bearing adjacent one of said die members, said passages all having longitudinal axes directed substantially parallel to each other and substantially parallel to said rotary axis; said passages all adjacent to said thin partition means, said passages having open terminal portions from and beyond which plastic filament may be extruded; and wall means projecting beyond said open terminal portions; said wall means being disposed adjacent said open terminal portions and being substantially parallel to said longitudinal axes of said passages; whereby plastic filaments which emerge from said open terminal passage portions of one of said die members may expansively react away from said wall means and bulge into contact interference with filaments being concurrently extruded from open terminal portions of said passages of another one of said die members.

2. The invention as defined in claim 1 wherein said wall means is carried by one of said die members and forming one radially directed side of each of said passages at and axially beyond said open terminal portions.

3. The invention as defined in claim 1 wherein said wall means is an annular row of spaced fingers disposed between said die members and respective annular rows of said passages; and means disposed to direct plastic filaments outwardly between said fingers; said fingers extending axially beyond said open terminal portions of said passages of said die members whereby expansive bulging of filaments between said fingers causes said last mentioned filaments to bulge laterally and radially into interference and contact with filaments extruded from said annular rows of passages in said concentric die members.

4. The invention as defined in claim 1 wherein said plurality of die members comprises three relatively rotatable die members all axially stepped relative to each other at said wall means; each of said die members thus comprising an element of said wall means carried thereby.

5. The invention as defined in claim 1 wherein one of said partition means comprises a hollow sleeve-like member secured to a respective die member; and said respective passages being close to an annular surface of said partition means.

6. The invention as defined in claim 1 wherein one of said partition means is integral with a respective die member; and said respective passages are close to an external annular surface of said partition means.

References Cited
UNITED STATES PATENTS

| | | |
|---|---|---|
| 2,919,467 | 1/1960 | Mercer. |
| 3,163,691 | 12/1964 | Anderson et al. |
| 3,228,063 | 1/1966 | Gutierrez. |
| 3,308,220 | 3/1967 | Smith. |

ANDREW R. JUHASZ, Primary Examiner

L. GILDEN, Assistant Examiner

U.S. Cl. X.R.

264—167